A. C. VAUCLAIN.
BRAKE SHOE.
APPLICATION FILED JAN. 18, 1909.

934,775.

Patented Sept. 21, 1909.

Witnesses:
Walter F. Pullinger
Augustus B. Coppes

Inventor:
Andrew C. Vauclain
by his Attorneys
Howson & Howson

UNITED STATES PATENT OFFICE.

ANDREW C. VAUCLAIN, OF PHILADELPHIA, PENNSYLVANIA.

BRAKE-SHOE.

934,775.

Specification of Letters Patent. Patented Sept. 21, 1909.

Application filed January 18, 1909. Serial No. 472,867.

*To all whom it may concern:*

Be it known that I, ANDREW C. VAUCLAIN, a citizen of the United States, residing in Philadelphia, Pennsylvania, have invented certain Improvements in Brake-Shoes, of which the following is a specification.

The object of my invention is to provide a brake shoe which will prevent chatter to a considerable extent and which will wear away evenly so that the portion which is "scrapped" after the shoe is worn will be much less than heretofore.

Figure 1:
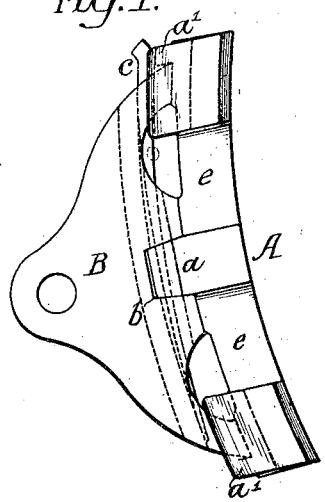
Figure 2:
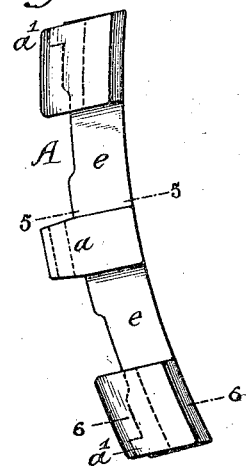
Figure 5:
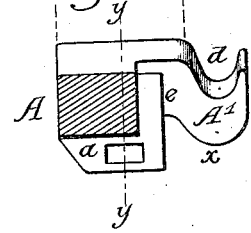
Figure 6:
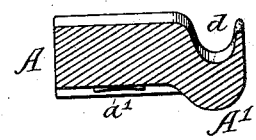
Figure 3:
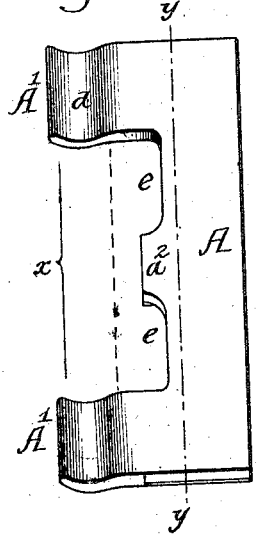
Figure 4:
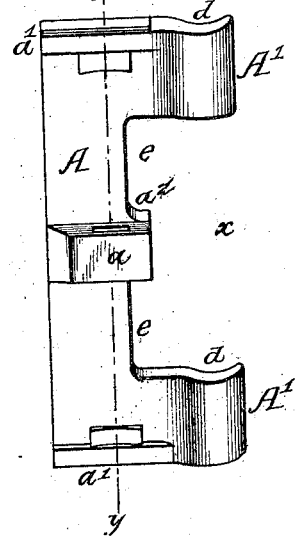
Figure 7:
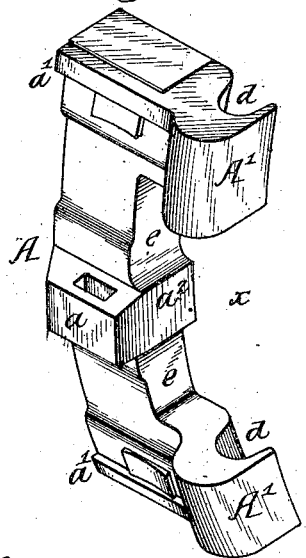

In the accompanying drawing: Figure 1, is a side view of my improved brake shoe applied to a brake head; Fig. 2, is a detached side view of the brake shoe; Fig. 3, is a face view; Fig. 4, is a rear view; Fig. 5, is a sectional view on the line 5—5, Fig. 2; Fig. 6, is a sectional view on the line 6—6, Fig. 2, and Fig. 7, is a perspective view of the shoe.

A is a brake shoe and B is a head to which the brake shoe is attached in the ordinary manner. The head has a cavity $b$ for the reception of the lug $a$ projecting from the rear of the brake shoe; the lug is perforated in the present instance, for the passage of a wedge pin $c$ of the ordinary type. At each end of the brake shoe are flanges $a'$, which extend over the ends of the head B. This particular shoe engages the flange of the wheel and bears against the tread of the wheel. This type of shoe is particularly adapted for motor driven car trucks where it is difficult to connect the two heads of the brake mechanism on opposite sides of the truck by means of a brake beam, and in order to keep the brake head and shoe in line the brake shoe is extended and has a groove $d$ in the extension into which the flange of the wheel projects, the flange keeping the shoe in proper alinement, but brake shoes made in the ordinary manner and having a groove are liable to chatter and wear unevenly as they are not properly balanced owing to the fact that the shoe is unevenly hung, and will intermittently bind and release the flange of the wheel. Furthermore, a projection has to be made at the rear of the brake shoe from which the lug extends, and consequently the value of this extra metal is practically lost when the shoe is "scrapped."

By my invention not only the frictional pull but the rapidity of wear of the entire shoe will be practically equal, and will remain so throughout the life of the shoe, and when the shoe is worn to its limit the weight is much less than any shoe heretofore made.

Referring to the drawings, the body portion A of the shoe has lateral projections A' at each end, and these projections have a groove $d$ for the reception of the flange of the wheel, the extension between the projections being cut away, to form a recess $x$, and this recess is extended into the body of the shoe as at $e$, so as to reduce the bearing surface, on the flange side of the center line $y$—$y$ of the shoe (Figs. 3 and 5). The longitudinal balance line $y$—$y$ of this brake shoe is farther away from the flange side of the shoe than the ordinary shoe of this type, and consequently is nearer the center line of the tread of the wheel, so that when pressure is applied there is no tendency of the brake shoe to intermittently grip and release the flange of the wheel, and the face of the brake shoe will wear evenly throughout its entire surface.

By making the brake shoe in the manner above described, I need not provide a projection at the back of the shoe as the lug can project directly from the body portion A of the shoe. I preferably strengthen this lug, however, by making a lateral projection $a^2$ on the body portion which extends into the recess $e$, as illustrated in Fig. 3, but this projection wears away with the body of the shoe and is not waste when the shoe is "scrapped."

The recess $e$ extends entirely through the shoe from the face to the back, so that the wearing face of the shoe is not changed as the shoe is reduced in thickness.

I have found by practical experiments that the shoe materially reduces the chatter so objectionable in this type of brake shoe, and that when the shoe is completely worn and in condition to be discarded, the weight of the scrapped shoe is much less than that of the ordinary shoes now in common use.

I claim :—

1. A brake shoe having a grooved portion engaging the flange of the wheel, a section of the grooved portion and part of the tread of the shoe being entirely cut away so that not only the frictional pull but the rapidity of wear will be practically equal and will remain so throughout the life of the shoe.

2. A brake shoe having a grooved portion engaging the flange of the wheel, a section of the grooved portion and part of the tread being entirely cut away, and a central lug projecting from the rear of the body of the brake shoe and by which it is attached to the head.

3. A brake shoe having a body portion with lateral extensions at each end, said extensions being grooved to engage the flange of a wheel, the body portion being also recessed between the two extensions so as to decrease the area of the bearing surface on one side of a longitudinal balance line.

4. A brake shoe having a bearing face and lateral extensions at each end grooved to receive the flanges of the wheel, the face of the brake shoe being recessed, and a portion of the face of the shoe at the center projecting into the recess, and a lug projecting from the rear of the shoe.

In testimony whereof, I have signed my name to this specification, in the presence of two subscribing witnesses.

ANDREW C. VAUCLAIN.

Witnesses:
Jos. H. Klein,
Wm. A. Barr.